(12) United States Patent
Roberts et al.

(10) Patent No.: US 10,561,010 B2
(45) Date of Patent: Feb. 11, 2020

(54) INTERNALLY ENERGIZED ELECTRODE OF A PLASMA ARC TORCH

(71) Applicant: Hypertherm, Inc., Hanover, NH (US)

(72) Inventors: Micah Roberts, Lebanon, NH (US); Christopher Pillsbury, Lebanon, NH (US); Steve Dunbar, Lebanon, NH (US)

(73) Assignee: Hypertherm, Inc., Hanover, NH (US)

( * ) Notice: Subject to any disclaimer, the term of this patent is extended or adjusted under 35 U.S.C. 154(b) by 478 days.

(21) Appl. No.: 15/386,297

(22) Filed: Dec. 21, 2016

(65) Prior Publication Data

US 2017/0181261 A1 Jun. 22, 2017

Related U.S. Application Data

(63) Continuation-in-part of application No. 15/228,708, filed on Aug. 4, 2016, now Pat. No. 10,278,274, and
(Continued)

(51) Int. Cl.
*B23K 10/00* (2006.01)
*H05H 1/28* (2006.01)

(52) U.S. Cl.
CPC .................. *H05H 1/28* (2013.01)

(58) Field of Classification Search
CPC .. H05H 1/28; H05H 1/34; H05H 1/26; H05H 2001/3473; B23K 9/285
(Continued)

(56) References Cited

U.S. PATENT DOCUMENTS 5,247,152 A * 9/1993 Blankenship ............ H05H 1/28
219/121.48
5,756,959 A * 5/1998 Freeman ................ B23K 10/00
219/119
(Continued)

FOREIGN PATENT DOCUMENTS

EP 0941018 A2 9/1999
WO 2008101226 A1 8/2008

OTHER PUBLICATIONS

Komatsu America Industries, LLC: "TFPL Twister Series", Retrieved from the internet at: http://fineplasma.com/kai/ctd/en/tfp/pdf/eTFP.pdf, printed Oct. 27, 2016, 6 pages.
(Continued)

*Primary Examiner* — Mark H Paschall
(74) *Attorney, Agent, or Firm* — Proskauer Rose LLP

(57) ABSTRACT

A coolant tube for a plasma arc torch is provided. The coolant tube includes an elongated coolant tube body including a distal portion configured to engage an electrode and a proximal portion configured to engage a body of the plasma arc torch. The coolant tube also includes a first electrically conductive element coupled to the distal portion of the elongated coolant tube body. The first electrically conductive element is configured to physically contact an electrode. The coolant tube further includes a second electrically conductive element coupled to the proximal portion of the elongated coolant tube body. The second electrically conductive element is configured to physically contact the body of the plasma arc torch. The elongated coolant tube body defines a current path and a fluid path between the body of the plasma arc torch and the electrode.

25 Claims, 7 Drawing Sheets

Related U.S. Application Data a continuation-in-part of application No. 15/228,750, filed on Aug. 4, 2016, and a continuation-in-part of application No. 15/228,758, filed on Aug. 4, 2016, and a continuation-in-part of application No. 15/228,813, filed on Aug. 4, 2016.

(60) Provisional application No. 62/270,178, filed on Dec. 21, 2015.

(58) Field of Classification Search
USPC ...... 219/121.49, 121.48, 121.51, 121.59, 75, 219/121.39
See application file for complete search history.

(56) References Cited

U.S. PATENT DOCUMENTS

| | | | |
|---|---|---|---|
| 5,841,095 A | 11/1998 | Lu et al. | |
| 6,215,090 B1* | 4/2001 | Severance, Jr. | H05H 1/34 |
| | | | 219/121.48 |
| 6,852,944 B2 | 2/2005 | Mackenzie et al. | |
| 6,919,526 B2* | 7/2005 | Kinerson | B23K 9/291 |
| | | | 219/121.5 |
| 8,633,417 B2* | 1/2014 | Ashtekar | H05H 1/28 |
| | | | 219/119 |
| 9,386,679 B2* | 7/2016 | Bauer | H05H 1/28 |
| 10,278,274 B2* | 4/2019 | Sanders | G06K 19/07773 |
| 2004/0200810 A1 | 10/2004 | Brandt et al. | |
| 2008/0116179 A1* | 5/2008 | Cook | H05H 1/28 |
| | | | 219/121.48 |
| 2017/0182585 A1* | 6/2017 | Yamaguchi | B23K 10/00 |

OTHER PUBLICATIONS

Komatsu America Industries, LLC: "Next Generation Twister TFP6062-300A Power Supply Units", Retrieved from the internet at: http://www.komatsuplasma.com/kai/ctd/en/tfp6062/pdf/TFP6062_Brochure.pdf, printed Oct. 27, 2016, 2 pages.

* cited by examiner

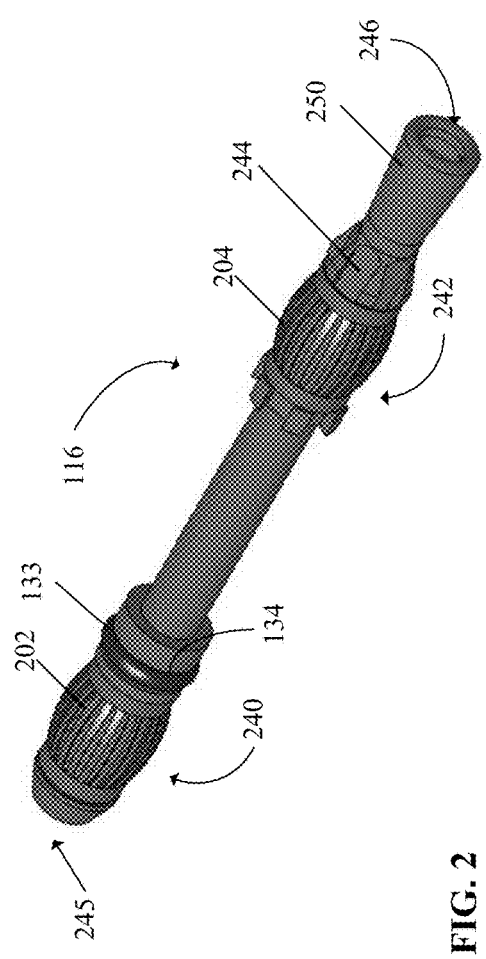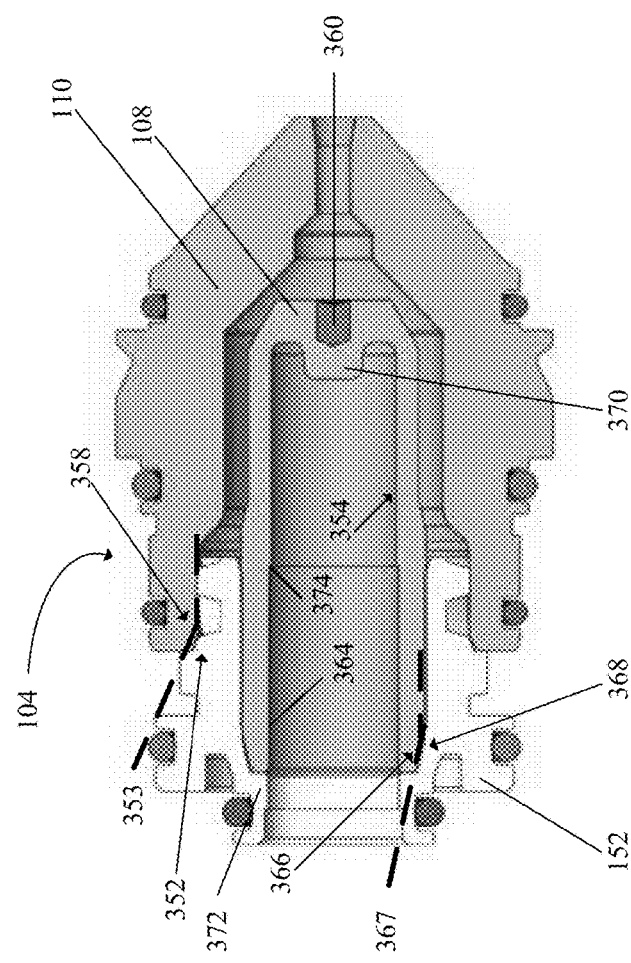

INTERNALLY ENERGIZED ELECTRODE OF A PLASMA ARC TORCH

CROSS REFERENCE TO RELATED APPLICATION

This application is a continuation-in-part of U.S. Ser. Nos. 15/228,708, 15/228,750, 15/228,758 and 15/228,813, filed Aug. 4, 2016, which are owned by the assignee of the instant application and are incorporated herein by reference in their entireties. This application also claims the benefit of and priority to U.S. Provisional Patent Application No. 62/270,178, filed Dec. 21, 2015, which is owned by the assignee of the instant application and incorporated herein by reference in its entirety.

TECHNICAL FIELD

The present invention generally relates to systems and methods for internally energizing an electrode in a liquid-cooled plasma arc torch using a coolant tube of the torch.

BACKGROUND

Thermal processing torches, such as plasma arc torches, are widely used for high temperature processing (e.g., heating, cutting, gouging and marking) of materials. A plasma arc torch generally includes a torch head, an electrode mounted within the torch head, an emissive insert disposed within a bore of the electrode, a nozzle with a central exit orifice mounted within the torch head, a shield, electrical connections, passages for cooling, passages for arc control fluids (e.g., plasma gas) and a power supply. A swirl ring can be used to control fluid flow patterns in the plasma chamber formed between the electrode and the nozzle. In some torches, a retaining cap is used to maintain the nozzle and/or swirl ring in the plasma arc torch. In operation, the torch produces a plasma arc, which is a constricted jet of an ionized gas with high temperature and sufficient momentum to assist with removal of molten metal. Gases used in the torch can be non-reactive (e.g., argon or nitrogen), or reactive (e.g., oxygen or air).

Existing plasma arc torches require the use of multiple distinct consumable components that need to be individually assembled into each torch and in a specific order/orientation to enable proper torch operation. FIG. 7 shows an exemplary configuration of such a conventional plasma arc torch. In some cases, two or more consumable components of a torch can be combined into a cartridge to reduce part count, improve part maintenance, and facilitate torch operation. However, improvements are still needed to further simplify torch parts and enhance installation and removal of consumable components relative to a torch. For example, given a unitary cartridge of multiple consumable components, it is difficult to install the cartridge onto a torch body because multiple components of the cartridge, thus multiple engagement surfaces, need to be oriented and aligned correctly with the torch body to achieve engagement. Further, improvements are needed to allow components in a torch to be easily accessible and serviceable.

SUMMARY

The present invention provides a liquid-cooled plasma arc torch capable of routing electrical current from a torch body, through a liquid coolant tube, to an inside surface of an electrode in a cartridge of the torch. The current-carrying and liquid-carrying coolant tube of the present invention can energize the interior surface of the electrode and facilitate positioning of the cartridge relative to the torch body. For example, the coolant tube of the present invention can allow positioning of the cartridge relative to the torch body via a nozzle interface while the electrode remains non-affixed with respect to the torch body.

In one aspect, a coolant tube for a plasma arc torch is provided. The coolant tube includes an elongated coolant tube body including a distal portion configured to engage an electrode and a proximal portion configured to engage a body of the plasma arc torch. The coolant tube also includes a first electrically conductive element coupled to the distal portion of the elongated coolant tube body. The first electrically conductive element is configured to physically contact an electrode. The coolant tube further includes a second electrically conductive element coupled to the proximal portion of the elongated coolant tube body. The second electrically conductive element is configured to physically contact the body of the plasma arc torch. The elongated coolant tube body defines a current path and a fluid path between the body of the plasma arc torch and the electrode. Each of the first and second electrically conductive elements is configured to pass substantially all of a current from the body of the plasma arc torch to the electrode.

In some embodiments, the coolant tube further includes a plurality of liquid flow channels circumferentially disposed about an external surface of the coolant tube at the distal portion of the elongated coolant tube body. The first electrically conductive element can substantially overlay the plurality of liquid flow channels on the exterior surface of the coolant tube.

In some embodiments, at least one of the first or second electrically conductive element is a Louvertac™ band. In some embodiments, the second electrically conductive element is a threaded section configured to engage the body of the plasma arc torch. In some embodiments, the first electrically conductive element is adapted to physically contact the electrode at an internal surface of the electrode. In some embodiments, the second electrically conductive element is adapted to physically contact the body of the plasma arc torch at an internal surface of the body.

In some embodiments, the current path defined by the elongated coolant tube body is configured to carry a current of at least about 30 amps (A).

In some embodiments, the proximal portion of the elongated coolant tube body comprises a sealing surface circumferentially disposed about an external surface of the coolant tube. In some embodiments, the coolant tube includes one or more positioning features on an external surface of the distal portion of the coolant tube, the one or more positioning features configured to radially center the coolant tube relative to the electrode.

In another aspect, a method of electrically energizing an electrode in a plasma arc torch is provided. The torch comprises a torch body matingly engaged to a proximal end of a coolant tube. A distal end of the coolant tube is matingly engaged to a cavity defined by an internal surface of the electrode. The method includes forming an arc conduction surface on at least a portion of the internal surface of the electrode in the cavity and physically contacting, by the arc conduction surface of the electrode, an electrically conductive component of the coolant tube. The method also includes receiving, by the electrode, substantially all of a current from the torch body via the coolant tube and the arc conduction surface to internally energize the electrode. The method further includes preventing direct electrical contact between the electrode and the torch body.

In some embodiments, the electrically conductive component comprises a current-carrying tolerance band. In some embodiments, the arc conduction surface comprises at least a portion of a sidewall of the cavity.

In some embodiments, the electrode is without a thread. In some embodiments, the electrode has a length-to-width radio of about 4.

In some embodiments, the method further includes radially centering the electrode relative to the coolant tube.

A method of electrically energizing an electrode is provided. The method includes matingly engaging a proximal end of a coolant tube with a plasma arc torch body, matingly engaging a distal end of the coolant tube with a cavity defined by an internal surface of the electrode, and forming a physical interface between at least a portion of the internal surface of the electrode in the cavity and an electrically conductive component of the coolant tube. The method also includes passing substantially all of a current from the plasma arc torch body to the electrode via the coolant tube and the physical interface to internally energize the electrode, preventing direct electrical contact between the torch body and the electrode, and conducting a liquid coolant flow from the torch body to the cavity of the electrode via an interior region of the coolant tube.

In some embodiments, matingly engaging a proximal end of a coolant tube to a plasma arc torch body comprises fitting by interference a Louvertac™ band at the proximal end of the coolant tube into a cavity defined by the torch body. In some embodiments, matingly engaging a proximal end of the coolant tube to a plasma arc torch body comprises threading the proximal end of the coolant tube to the torch body.

In some embodiments, matingly engaging a distal end of the coolant tube with a cavity of the electrode comprises fitting by interference the electrically conductive component into the cavity of the electrode. In some embodiments, matingly engaging a distal end of the coolant tube with a cavity of the electrode comprises axially affixing the cavity of the electrode to the distal end of the coolant tube substantially without rotational engagement.

In some embodiments, the electrically conductive component comprises a Louvertac™ band.

In some embodiments, the method further comprises impinging the coolant flow against a distal bottom of the cavity, reversing the coolant flow toward the torch body over an exterior surface of the coolant tube, and passing the coolant flow through a plurality of longitudinal channels disposed on the exterior surface of the coolant tube at the distal end, thereby reducing a pressure of the coolant flow.

In some embodiments, the method further comprises radially centering the coolant tube in relation to the electrode.

In another aspect, an electrode assembly for a liquid-cooled plasma arc torch is provided. The electrode assembly includes an elongated body defining a cavity configured to receive a distal portion of a coolant tube, and an arc conduction surface formed on an interior surface of the electrode and defining at least a portion of the cavity. The arc conduction surface is configured to electrically contact the coolant tube in the cavity. The electrode assembly also includes an insulator disposed on an external surface of the electrode configured to prevent direct electrical contact between the torch body and the electrode, and an emissive insert disposed at a distal end of the elongate body.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

FIG. 2 is an exemplary design of the coolant tube of FIG. 1, according to an illustrative embodiment of the invention.

FIG. 3 is a sectional view of a cartridge including the electrode of FIG. 1, according to an illustrative embodiment of the invention.

DETAILED DESCRIPTION

Figure 1:
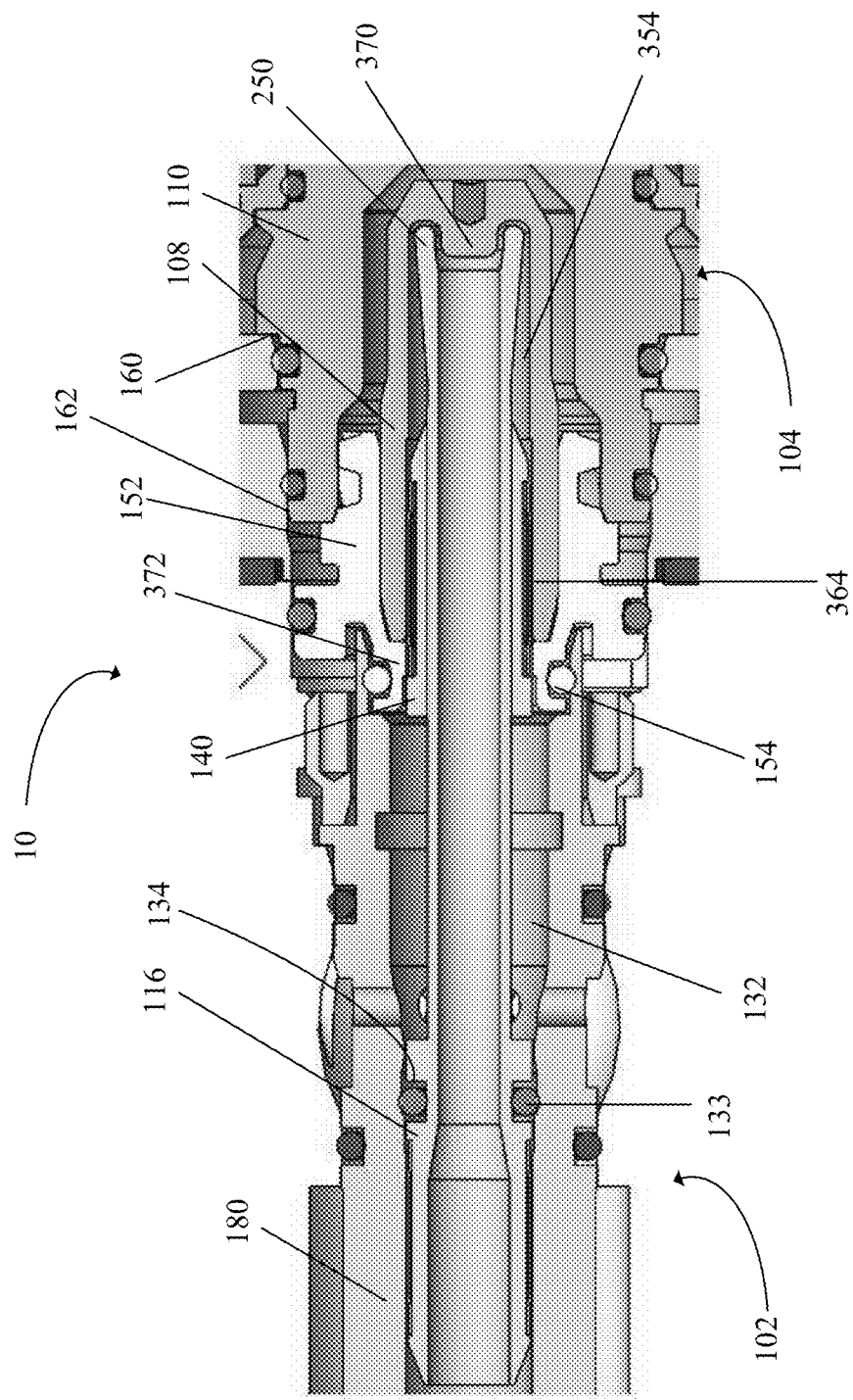
FIG. 1 is a cross-sectional view of an exemplary liquid-cool plasma arc torch generally comprising a liquid coolant tube and an internally energized electrode, according to an illustrative embodiment of the invention.

FIG. 1 is a cross-sectional view of an exemplary liquid-cool plasma arc torch 10 generally comprising a liquid coolant tube 116 and an internally energized electrode 108, according to an illustrative embodiment of the invention. The coolant tube 116 can be disposed in and connected to a torch body 102. The electrode 108 can be a part of a cartridge 104 that includes one or more additional consumable components, such as a nozzle 110 and/or a swirl ring 152. An exemplary design of the cartridge 104 is described below with reference to FIG. 3. Even though the liquid coolant tube 116 of the present invention is illustrated to internally energize the electrode 108 contained within a cartridge 104, in other embodiments, the coolant tube 116 can be used to internally energize an electrode in a non-cartridge configuration, such as in a plasma arc torch with consumables that are individually aligned and assembled.

The torch body 102 can be made of an electrically conductive material, such as brass. The torch body 102 can engage the coolant tube 116 in a manner that supports conduction of a pilot arc current and/or a transferred arc current from a conductive cathode block 180 to the coolant tube 116 and then to the electrode 108 after the cartridge 104 is matingly engaged to the torch body 102. As shown, the torch body 102 includes the conductive cathode block 180 having a substantially hollow interior channel 132. The conductive cathode block 180 can be in electrical communication with a power supply (not shown). The distal end of the interior channel 132 of the cathode block 180 can electrically and/or physically couple to the coolant tube 116. For example, an exterior surface of the coolant tube 116 can define an o-ring groove 134 that houses at least one o-ring 133 configured to form an interface (e.g., a seal) with an inner surface of the cathode block 180 within the interior channel 132. Thus, at least a proximal portion of the coolant tube 116 can be inserted within and mated with the distal end of the cathode block 180 of the torch body 102. Generally, during operation, the coolant tube 116 distributes a cooling fluid to the cartridge 104 once the torch body 102 is coupled to the cartridge 104 and the plasma arc torch system is activated. Additionally, the coolant tube 116 can pass a current (pilot arc current and/or transferred arc current) from the cathode block 180 to the cartridge 104, such as to an interior surface of the electrode 108 of the cartridge 104.

In the cartridge 104, a distal end of the swirl ring 152 can be connected to a proximal end of the electrode 108. The swirl ring 152 can be made of a non-conductive insulator material, such as plastic. A proximal end of the swirl ring 152 is configured to connect, such as threaded into or sealed to by interference fit (e.g., via an o-ring 154), to the cathode block 180 of the torch body 102 when the cartridge 104 is installed on the torch body 102. The resulting housing, which comprises the cathode block 180, the swirl ring 152 and the electrode 108, substantially encases the coolant tube 116 to contain the coolant flow therein while allowing the coolant tube 116 to pass a current and/or liquid flow to the electrode 108. In some embodiments, the only electrical connection between the torch body 102 and the cartridge 104 is between the coolant tube 116 and the electrode 108. In this case, the swirl ring 152 (and/or any other cartridge component that physically contacts the torch body 102) can be substantially non-conductive. In some embodiments, additional locations of electrical connection are established, such as between the swirl ring 152 (if it is conductive) and the cathode block 180 of the torch body 102. As shown in FIG. 1, both the swirl ring 152 and the nozzle 110 of the cartridge 104 contact the torch body 102 upon engagement between the torch body 102 and the cartridge 104. In some embodiments, the contact between the nozzle 110 and the torch body 102 drives alignment (e.g., axial and/or radial alignment) of the cartridge 104 relative to the torch body 102. The swirl ring 152 can connect to and contact the torch body 102 (e.g., via the O-ring 154) to form a seal, but may or may not contribute to the alignment of the cartridge 104 relative to the torch body 102. In some embodiments, the swirl ring 152 does not make physical contact with the torch body 102 upon engagement between the torch body 102 and the cartridge 104.

FIG. 2 is an exemplary design of the coolant tube 116 of FIG. 1, according to an illustrative embodiment of the invention. The coolant tube 116 can be made of a conductive material, such as brass. As illustrated, the coolant tube 116 has an elongated body with a proximal portion (generally referred to as the proximal end) 240, which is the end that is configured to engage with the cathode block 180 of the torch body 102, and a distal portion (generally referred as the distal end) 242, which is the end that is configured to engage with the electrode 108 of the cartridge 104 as the torch body 102 is secured to the cartridge 104. The coolant tube 116 can have a distal tip 250 disposed at the distal portion 242. In some embodiments, the distal tip 250 has a bell/flared shape, where a diameter of the distal tip 250 becomes large and/or more flared as it extends in the distal direction.

The proximal end 240 of the elongated body of the coolant tube 116 can include the sealing surface 134 (e.g., configured to house the o-ring 133) circumferentially disposed about an external surface of the coolant tube 116 to couple the coolant tube 116 to the torch body 102. In some embodiments, the proximal end 240 of the coolant tube 116 is coupled (e.g., by interference fit) to the distal end of the cathode block 180 in a manner that it can be easily or quickly disconnected. In other embodiments, the proximal end 240 of the coolant tube 116 is coupled (e.g., by threading) to the distal end of the cathode block 180 in a manner that it cannot be easily or quickly disconnected. The coolant tube 116 can have an electrical connector, such as a Louvertac™ band 202, around an external surface at the proximal end 240. The Louvertac band 202 is configured to physically contact the torch body 102, such as at the interior surface of the cathode block 180 of the torch body 102 within the channel 132, thereby conducting an electrical current from the cathode block 180 to the sidewall of the coolant tube 116 once the proximal end 240 of the coolant tube 116 is inserted into and mated with the distal end of the cathode block 180. Additionally, the use of the Louvertac™ band 202 at the proximal end 240 of the coolant tube 116 allows the coolant tube 116 to be slidably coupled and matingly engaged to the cathode block 180 by interference fit (e.g., via at least one of the sealing surface 134 or the Louvertac band 202). Alternatively, the coolant tube 116 can be fixedly secured to the cathode block 180 via threads or other current-carrying methods without the Louvertac band 202.

In some embodiments, the coolant tube 116 has an electrical connector, such as a Louvertac™ band 204, around an exterior surface at the distal end 242 of the coolant tube 116. The Louvertac band 204 is configured to physically contact a surface the electrode 108, such as a surface on an interior cavity 354 of the electrode 108, as shown in FIG. 1. In some embodiments, the coolant tube 116 includes one or more longitudinal liquid flow channels 244 circumferentially disposed about its exterior surface below the Louvertac band 204 at the distal end 242. These longitudinal liquid flow channels 244 can be substantially covered by the Louvertac band 204 and are configured to allow a coolant flow over the exterior surface of the coolant tube 116 without being impeded by the presence of the Louvertac band 204. Therefore, the flow channels 244 can prevent a pressure drop across the coolant tube 116 introduced by the use of the Louvertac band 204. Each of the longitudinal channels 244 can be bell shaped and extend along the length of the distal portion 242 of the coolant tube 116, where the two ends of each channel 244 are narrower in width than that of the middle section of the channel 244. In some embodiments, the use of the Louvertac™ band 204 at the distal end 242 of the coolant tube 116 allows the coolant tube 116 to be slidably coupled and matingly engaged to the cartridge 104 by interference fit. This feature is described below in detail.

The elongated body of the coolant tube 116 can be substantially hollow such that it can provide a coolant flow path between the torch body 102 and the electrode 108 in its interior volume. For example, the coolant tube 116 has an opening 245 at its proximal end 240 and an opening 246 at its distal end 242 for allowing a coolant flow to enter and leave the coolant tube 116, respectively. Additionally, the sidewall of the elongated body of the coolant tube 116 can provide a current path between the the torch body 102 and the electrode 108. In some embodiments, the sidewall of the elongated body of the coolant tube 116 is the main current path between the torch body 102 and the electrode 108. In some embodiments, the Louvertac band 202 and/or the Louvertac band 204 are configured to pass substantially all of a current between the two components.

FIG. 3 is a sectional view of the cartridge 104 including the electrode 108 of FIG. 1, according to an illustrative embodiment of the invention. In addition to the electrode 108, the cartridge 104 can include the swirl ring 152 and the nozzle 110. The various components of the cartridge 104, including the swirl ring 152, the electrode 108, and the nozzle 110, can be concentrically disposed.

In some embodiments, the various components of the cartridge 104 are secured, either directly or indirectly, to the swirl ring 152 while achieving axial alignment and radial alignment (i.e., centering) with respect to the swirl ring 152. For example, an outer diameter of the electrode 108 can be secured to an inner diameter of the swirl ring 152 such that at least a proximal portion of the electrode 108 is inserted into a distal portion of the swirl ring 152. As shown, the electrode 108 includes an outer retaining feature 366 (e.g., one or more steps of varying diameter of the electrode 108) on an exterior surface configured to matingly engage an inner retaining feature 368 (e.g., one or more complementary steps or protrusions) on an interior surface of the swirl ring 152 to prevent axial movement of the components relative to each other. The mating between the retaining features 366, 368 can be one of snap fit, press fit or interference fit. The resulting interface 367 between the electrode 108 and the swirl ring 152 also radially aligns/centers the two components. In some embodiments, an outer diameter of the swirl ring 152 is matingly engaged to an inner diameter of the nozzle 110. For example, the swirl ring 152 can be secured to the nozzle 110 by matingly engaging an outer retaining feature 352 (e.g., a step of varying diameter of the swirl ring 152) on an exterior surface with an inner retaining feature 358 (e.g., a complementary step or protrusion) on an interior surface of the nozzle 110 to prevent axial movement of the components relative to each other. The mating between the retaining features 352, 358 can be one of snap fit, press fit or interference fit. The resulting interface 353 between the swirl ring 152 and the nozzle 110 also radially aligns/centers the two components.

In some embodiments, the cartridge 104 can additionally include a shield (not shown). Even though the nozzle 110 of the cartridge 104 is shown as a non-vented nozzle, in other embodiments, the cartridge 104 can be suitably configured to include a vented nozzle (not shown). Further, FIG. 3 is merely illustrative of one type of cartridge that can be connected to the torch body 102 to establish a current path from the coolant tube 116 to the electrode 108 of the cartridge 104. Other cartridge designs, such as the cartridge described in U.S. Ser. No. 15/228,708, incorporated herein by reference in its entirety, can be suitably configured to provide a similar current-carrying function. In some embodiments, the coolant tube 116 and similar embodiments can be used in a traditional plasma arc torch having consumable stack-ups/sets (e.g., with separate and distinct electrode, nozzle, swirl ring, etc. that are individually aligned and assembled into the torch).

With respect to the electrode 108 of FIG. 3, the electrode 108 has an elongated body with an emissive insert 360 disposed in the distal end of the electrode 108 so that an emission surface is exposed. The insert 360 can be made of hafnium or other materials that possess suitable physical characteristics, including corrosion resistance and a high thermionic emissivity. The elongated body of the electrode 108 also defines the cavity 354 at an inner surface of the electrode 108. The cavity 354 can include a step or protrusion 370 located at the distal end for orienting and aligning the coolant tube 116. The cavity 354 is configured to receive at least a distal portion of the coolant tube 116, which can pass an electrical current (i.e., a pilot arc or transferred arc current) from the cathode block 180 of the torch body 102 to the cavity 354 via the Louvertac band 204, as described in detail below with respect to FIG. 4. Thus, an arc conduction surface 364 can be formed on at least a portion of the sidewall of the cavity 354 in the interior surface of the electrode 108. The arc conduction surface 364 can be in electrical and physical contact with the Louvertac band 204 of the coolant tube 116 once it is positioned within the cavity 354, thereby maintaining an electrical connection with the coolant tube 116. In some embodiments, the interior cavity 354 of the electrode 108 includes a step 374 that creates segments in the cavity with varying diameters, as shown in FIG. 3. Alternatively, the inner cavity 354 of the electrode 108 is smooth (e.g., has a constant diameter). In some embodiments, the outer retaining feature 366 of the electrode 108, which comprises an outer surface at the proximal end of the electrode 108, can be slightly scalloped/angled so as to radially and/or axially engage the swirl ring 152 at the engagement interface 367 (e.g., prevent the swirl ring 152 from being inserted too far distally relative to the electrode 108).

In some embodiments, as shown in FIG. 3, a back step 372 is disposed in an interior surface of the swirl ring 152. The back step 372 can be configured to set the depth and location of the coolant tube 116 (e.g., providing axial alignment for the coolant tube 116) relative to the electrode 108. The interior surface of the back step 372, which is preferably smooth, can contact the Louvertac band 204 affixed to the distal portion 242 of the coolant tube 116. In alternative embodiments, this back step can be on the electrode 108 for providing a similar depth-setting/alignment function for the coolant tube 116.

In general, the coolant tube 116 can maintain one or more areas of contact with various components of the cartridge 104. One area of contact is between the Louvertac band 204 around the coolant tube 116 and the arc conduction surface 364 of the electrode 108 as described above. Another area of contact can be between a step, flange or protrusion 140 (as shown in FIG. 1) around an exterior surface of the coolant tube 116 and the complimentary shaped back step 372 on the interior surface of the swirl ring 152. The step, flange or protrusion 140 of the coolant tube 116 can engage the back step 372 of the swirl ring 152 to prevent the coolant tube 116 from being inserted too far distally into the cavity 354 of the electrode 108. Yet another possible area of contact can be between the distal tip 250 of the coolant tube 116 and the protrusion 370 within the cavity 354 of the electrode 108, where the protrusion 370 can be used to center/radially align the coolant tube 116 relative to the electrode 108. This contact may be intermittent and minimal such that only a negligible amount of current is passed between the distal tip 250 of the coolant tube 116 and the protrusion 370 of the electrode 108 via this contact.

In some embodiments, substantially all of a pilot arc current and/or a transferred arc current can be passed indirectly from the torch body 102 to the electrode 108 via the coolant tube 116 and the Louvertac bands 202, 204, as described below with reference to FIG. 4. In these cases, an insulator, such as the swirl ring 152 or another insulator component, can be disposed on an external surface of the electrode 108 to prevent direct electrical contact between the torch body 102 and the electrode 108, such as between the cathode block 180 of the torch body 102 and the electrode 108. Details regarding the insulator component are described below with reference to FIG. 4.

With reference to FIGS. 1-3, in some embodiments, engagement between the torch body 102 and the cartridge 104 (e.g., radial and/or axial alignment between the torch body 102 and the cartridge 104) can occur outside of the coolant tube/electrode interface. For example, one or more engagement mechanisms can be disposed on the nozzle 110 of the cartridge 104 and the torch body 102 to form one or more engagement interfaces, such as engagement interfaces 160, 162, to secure and align the torch body 102 and the cartridge 104 to each other. As shown in FIG. 1, the engagement interface 160 is between the distal end of the torch body 102 and an exterior surface at a middle portion of the nozzle 110. Specifically, the exterior surface of the middle portion of the nozzle 110 can form a step, which serves as an axial stop relative to the distal end of the torch body 102. The engagement interface 162 is between an interior surface of the torch body 102 and an exterior surface of a proximal portion of the nozzle 110. In some embodiments, additional engagement features are disposed on the swirl ring 152 to engage the torch body 102. In some embodiments, both the swirl ring 152 and the nozzle 110 contact the torch body 102, but only the nozzle contact (e.g., via the engagement interfaces 160, 162) drives alignment between the torch body 102 and the cartridge 104. The swirl ring 152 merely connects to and/or seal against the torch body 102 (e.g., via the sealing surface 134), but does not provide an alignment function.

Upon interfacing the torch body 102 with the cartridge 104, the distal end 242 of the coolant tube 116 is adapted to be inserted into the cavity 354 of the electrode 108 such that the coolant tube 116 extends into the cavity 354. Further, once the coolant tube 116 is inserted into the cavity 354 of the electrode 108, the Louvertac band 204 at the distal end 242 of the coolant tube 116 radially aligns/centers the electrode 108 relative to the coolant tube 116, but does not affix the electrode 108 to any particular radial orientation relative to the coolant tube 116. In some embodiments, the protrusion 370 on the cavity 354 of the electrode, in cooperation with the bell-shaped distal tip 250 of the coolant tube 116, also radially centers the coolant tube 116 relative to the electrode 108. During assembly, an operator can apply an axial force to push the electrode 108 proximally against the coolant tube 116 until the Louvertac band 204 at the distal end 242 of the coolant tube 116 is seated within the cavity 354 of the electrode 108 and is covered by most of the cavity 354. The Louvertac band 204 of the coolant tube 116 thus allows the electrode 108 to be axially pushed on or pulled off during engagement or disengagement, respectively, without the use of threading (or other clocking movement), thereby enabling the use of a tool-free and/or threadless electrode 108. A tool-free electrode means that the electrode 108 can be connected to or disconnected from the coolant tube 116 without using any additional tools. Generally, the tolerance of the Louvertac band 204 can be tuned such that it is snug enough to promote electrical contact and conduction between the coolant tube 116 and the electrode 108, yet sufficiently loose to facilitate installation and adjustment.

The simple push-on/pull-off feature is also compatible with the engagement between the torch body 102 and the cartridge 104 at the interfaces 160, 162. That is, the coupling between the torch body 102 and the cartridge 104 can be governed by the engagement interfaces 160, 162 (between the torch body 102 and the nozzle 110) without the need to account for any threading or other clocking requirement between the electrode 108 and the coolant tube 116. In general, allowing the coolant tube 116 and the Louvertac band 204 to carry a current to the cartridge 104 separates (i) the physical interface between the torch body 102 and the cartridge 104 from (ii) the electrical connection between the coolant tube 116 and the electrode 108. This separation is adapted to maximize design space and simplify torch assembly. In addition, the relatively straight axial installation and removal of the coolant tube 116 (and thus the torch body 102) from the electrode 108 (thus the cartridge 104) promotes quicker consumable replacement and installation. Further, due to the placement of the Louvertac bands 202, 204 in relation to the coolant tube 116 (e.g., on an exterior surface of the coolant tube 116), the Louvertac bands 202, 204 can be easily inspected and readily serviced. In alternative embodiments, instead of using the Louvertac band 204, other current-carrying and/or retaining features can be used, such as thread attachments, interference fits, etc.

Figure 4:
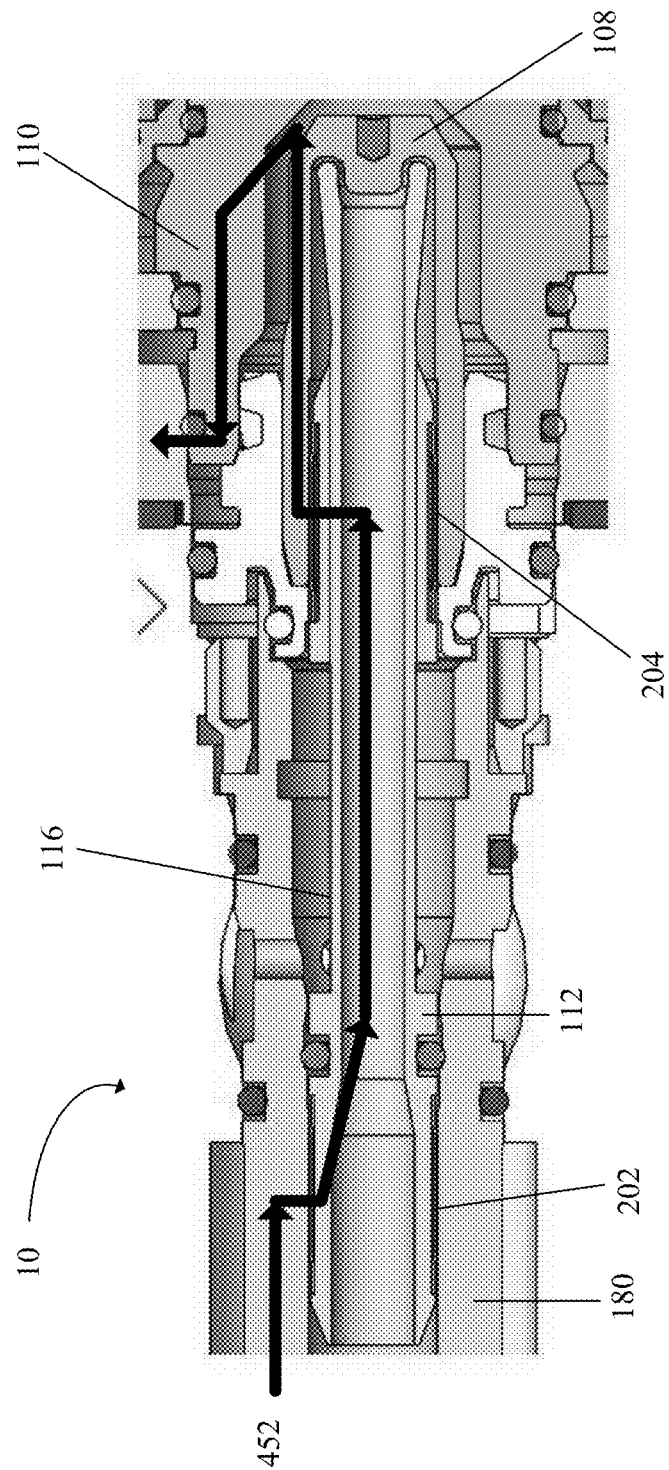
FIG. 4 is a sectional view of the plasma arc torch of FIG. 1 oriented to illustrate an exemplary pilot arc current path, according to an illustrative embodiment of the present invention.

FIG. 4 is a sectional view of the plasma arc torch 10 of FIG. 1 oriented to illustrate an exemplary pilot arc current path 452, according to an illustrative embodiment of the present invention. To start a pilot arc, a pilot arc current 452 associated with a high-frequency, high-voltage (HFHV) signal is coupled to a power line from a power supply (not shown) to the plasma arc torch 10. The pilot arc current flow 452 can be passed from the power supply to the cathode block 180, which transfers the current to the body of the coolant tube 116 via the Louvertac band 202 at the proximal end 240 of the coolant tube 116. The Louvertac band 202 can pass substantially all of the pilot arc current 452 from the cathode block 180 to the coolant tube 116. The pilot arc current 452 flows distally through the body of the coolant tube 116 and is transferred to the internal surface of the electrode 108 via the Louvertac band 204 at the distal end 242 of the coolant tube 116, thereby energizing the internal surface of the electrode 108. The Louvertac band 204 can pass substantially all of the current 452 from the coolant tube 116 to the electrode 108. Once at the electrode 108, the pilot arc current path 452 induces a spark discharge in a plasma gas flowing in the gap between the electrode 108 and the nozzle 110, thereby generating a pilot arc in the gap. To complete the pilot arc circuit, the pilot arc current path 452 can return to the torch body 102 by flowing proximally from the nozzle 110 to the torch body 102.

The gas flow in the gap between the electrode 108 and the nozzle 110 is ionized by the pilot arc so that electrical resistance between the electrode 108 and a workpiece (not shown) becomes small. A voltage higher than the voltage used to initiate the pilot arc can be applied across the electrode 108 and the workpiece to induce the arc to transfer to the workpiece after the gap is ionized. This arc between the electrode 108 and the workpiece is a transferred arc. To maintain the transferred arc, a transferred arc current, which supplies a higher voltage from the power supply, is passed from the cathode block 180 to the electrode 108 via the coolant tube 116 and the Louvertac bands 702, 704 in a substantially similar fashion as the distal pilot arc current flow 452 described above. To complete the transferred arc circuit, the transferred arc current is returned from the workpiece to the power supply through separate wirings (not shown). Generally, the elongated body of the coolant tube 116 can support conduction of a current that is at least 30 amps.

Thus, a pilot arc current and/or transferred arc current from the power supply can be routed from the cathode block 180 of the torch body 102 to the coolant tube 116, and to the electrode 108 of the cartridge 104 via the inner surface of the electrode cavity 354. The current-carrying coolant tube 116 thus energizes the interior surface of the electrode 108. The one or more Louvertac bands 202, 204 on either or both ends 240, 242 of the coolant tube 116 are used to facilitate conduction of electricity (e.g., passing substantially all of the pilot arc current and/or the transferred arc current) from the power supply to the inner surface of the electrode 108.

In some embodiments, because substantially all of the pilot arc and transferred arc current is carried from the power supply to the electrode 108 by the coolant tube 116, the electrode 108 does not need to be in direct electrical or physical contact with the torch body 102 for current transfer purposes. Therefore, the electrode 108 can be electrically isolated from the cathode block 180 (or other conductive components of the torch body 102) such that no direct current can be passed between the electrode 108 and the torch body 102. This can be accomplished by inserting the non-conductive swirl ring 152 between the electrode 108 and the cathode block 180. In other embodiments where the swirl ring 152 is conductive, a non-conductive electrical insulator (not shown) can be inserted between the electrode 108 and the cathode block 180 (or other conductive components of the torch body 102) to provide the same insulating function. In these cases, because the electrode 108 no longer maintains direct physical or electrical contact with the torch body 102, the electrode 108 can be shorter than an electrode that is used to receive an electrical current directly from the cathode block 180 (i.e., without using the coolant tube 116), such as more than 25% shorter (e.g., 27% shorter) than a direct-contact electrode. In some embodiments, the electrode 108 has a length-to-width radio of about 4.

Figure 5:
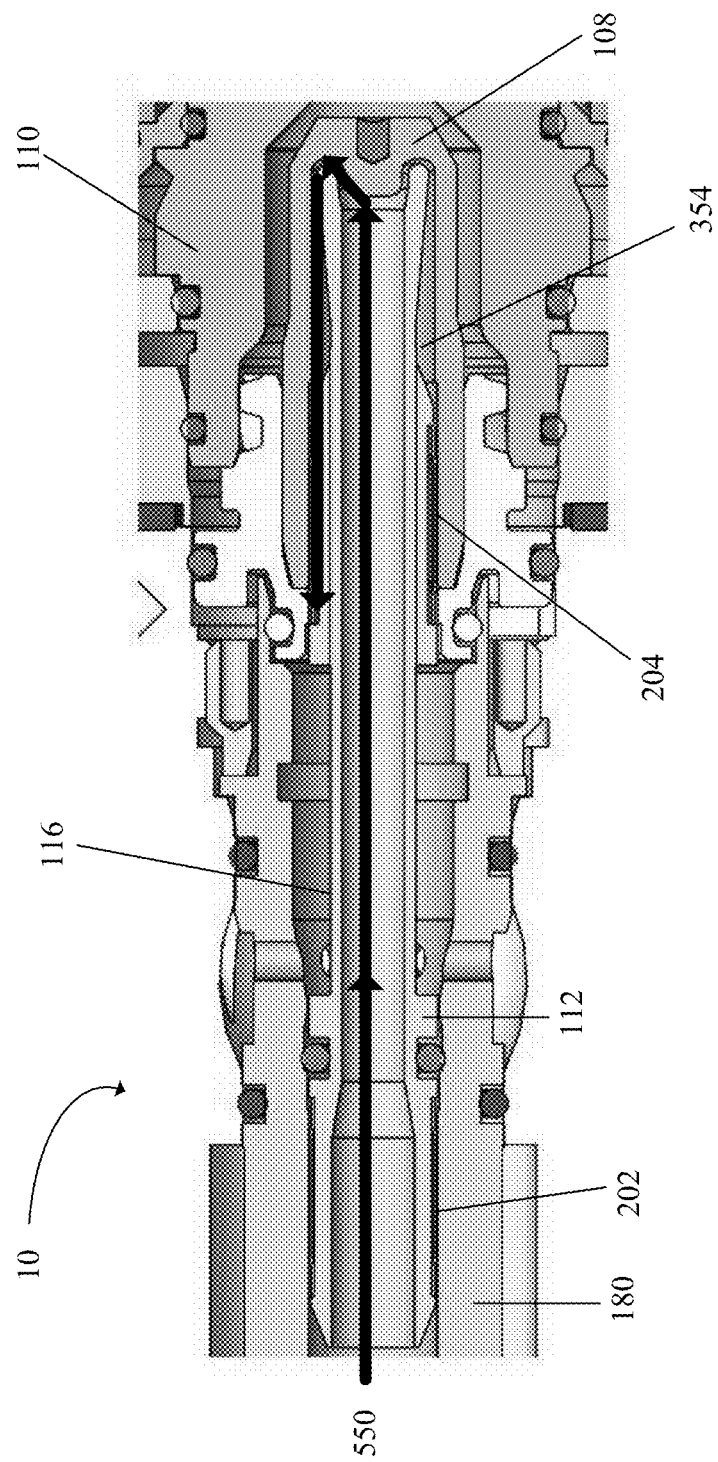
FIG. 5 is a sectional view of the plasma arc torch of FIG. 1 oriented to illustrate an exemplary liquid coolant flow path, according to an illustrative embodiment of the present invention.

Further, the coolant tube 116 can be configured to direct a liquid coolant flow for circulation between the torch body 102 to the cartridge 104. Exemplary liquid coolant includes water, propylene glycol, ethylene glycol, or any number of commercially available coolants designed for plasma cutting systems. FIG. 5 is a sectional view of the plasma arc torch 10 of FIG. 1 oriented to illustrate an exemplary liquid coolant flow path 550, according to an illustrative embodiment of the present invention. Along the liquid coolant flow path 550 of FIG. 5, a liquid coolant is introduced to the cathode block 180 of the torch body 102, which is in fluid connection with the proximal opening 245 at the proximal end 240 of the coolant tube 116. Once in the interior volume of the coolant tube 116, the coolant flow path 550 continues on longitudinally toward the distal end 242 of the coolant tube 116. The coolant flow 550 exits from the coolant tube 116 via the distal opening 246 of the coolant tube 116 and enters into a cavity 354 defined by the inner surface of the electrode 108 of the cartridge 104, thereby substantially cooling the electrode 108. As guided by the sidewall of the cavity 354, the coolant flow 550 can reverse direction and continue on proximally along the outer surface of the coolant tube 116. This reverse flow also substantially cools the Louvertac band 204 surrounding an exterior portion of the distal end 242 of the coolant tube 116. In some embodiments, the reverse coolant flow can travel through the longitudinal channels 244 on the exterior surface of the coolant tube 115 beneath the Louvertac band 204, thereby limiting a pressure drop between the coolant tube 116 and the electrode 108 in that area caused by the use of the Lovertac band 204. Another factor that contributes to the minimization of pressure drop between the coolant tube 116 and the electrode 108 is the bell/flared shape of the distal tip 250 of the coolant tube 116, which can reduce or substantially eliminate the pressure drop induced by the inclusion of the Louvertac band 204. The coolant flow 550 can continue in the proximal direction toward the cathode block 180 of the torch body 102 along the outer surface of the coolant tube 116. This coolant flow can also be distributed to other parts of the torch body 102 and/or the cartridge 104 to cool various torch components.

Figure 6:
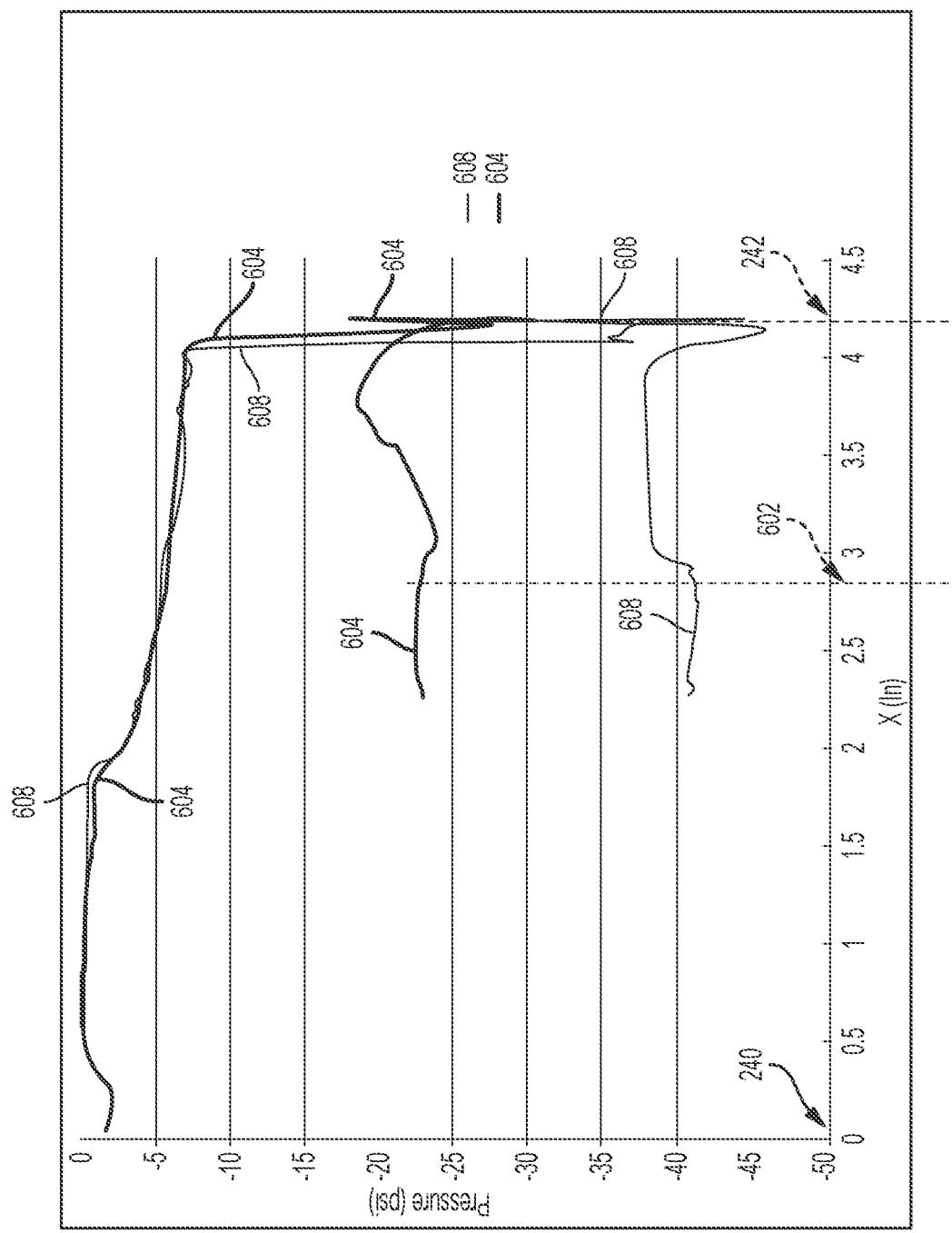
FIG. 6 is a plot of exemplary test results generated using the coolant tube to internally energize the electrode in the torch design of FIG. 1, according to an illustrative embodiment of the present invention.

FIG. 6 is a plot of exemplary test results generated using the coolant tube 116 to internally energize the electrode 108 in the torch design 10 of FIG. 1. Specifically, FIG. 6 shows a pressure drop plot 604 along the length of the coolant tube 116, from the proximal end 240 of the coolant tube 116 to the distal end 242 of the coolant tube 116 (indicated on the x-axis). As shown, the coolant tube 116 generates a pressure drop of about 23 psi at the coolant tube location 602, which is where the longitudinal channels 244 are disposed. This pressure drop 604 is much lower than the pressure drop 608 of about 41 psi generated from a torch with a traditional coolant tube configuration at a similar coolant tube location. In some embodiments, the use of the Louvertac bands 202, 204 can still introduce a pressure drop across the coolant tube 118, but this drop is balanced by (i) the shape, design and cross-sectional area of the longitudinal channels 244 beneath the Louvertac band 204, (ii) the flared/bell shape of the distal tip 250 of the coolant tube 116 and (iii) the protrusion 370 within the cavity 354 of the electrode 108. For example, the flared/bell shape of the distal tip 250 is adapted to minimize dead zones and recirculation of the coolant flow about the distal tip 250. In contrast, a relatively straight, pipe-like end has hard corners and edges, which can produce/induce a large amount of recirculation and dead zones in the flow. Hence, the bell-like shape and rounded corners of the present coolant tube design 116 enhance flow.

Figure 7:
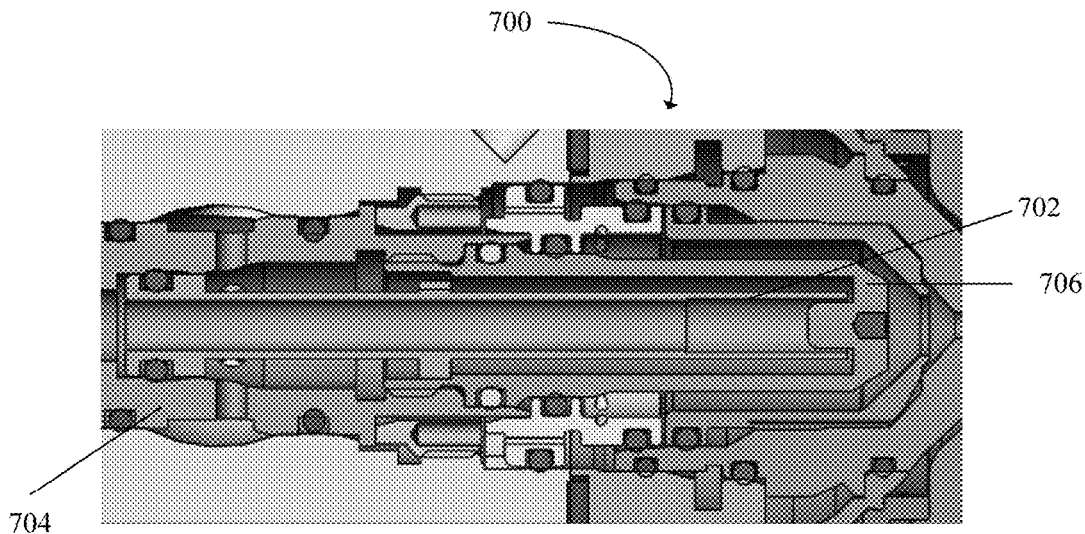
FIG. 7 is a sectional view of a conventional plasma arc torch having a traditional coolant tube installed therein.

FIG. 7 is a sectional view of a conventional plasma arc torch 700 having a traditional coolant tube installed therein, according to an illustrative embodiment of the present invention. This torch 700 can be used to generate the pressure drop plot 608 of FIG. 6. In the plasma arc torch 700 of FIG. 7, the coolant tube 702 does not have a Louvertac band at either end of the tube 702, thus does not include any longitudinal channels on an exterior surface to enable coolant flow in the presence of a Louvertac band. In addition, the coolant tube 702 does not have any features, such as the bell shaped distal tip 250, for minimizing a pressure drop in the coolant flow as it travels along the coolant tube 702. In contrast, as described above, the longitudinal channels 244 on the exterior surface of the coolant tube 116 of the present invention allows fluid flow between the exterior surface of the coolant tube 116 and the interior surface of the cavity 354 of the electrode 108 after the Louvertac band 204 is coupled to the coolant tube 116, which result in a reduction of pressure drop across the coolant tube 116 introduced by the use of the Louvertac band 204. In addition, the flared design at the distal tip 250 of the coolant tube 116 generally limits a pressure drop, which cannot be achieved by the generally cylindrical coolant tube 702 of the convention plasma arc torch 700, where the diameter of the coolant tube 702 is substantially constant along the entire coolant tube length.

The coolant tube 702 of the conventional plasma arc torch 700 also does not provide a current path between the torch body 704 and the electrode 706. For example, physical contact between the coolant tube 702 and the electrode 706 within the plasma arc torch 700 of FIG. 7 is minimal, certainly does not amount to the level required to conduct an electrical current as described in certain embodiment of the present invention. Hence, the electrode 706 of the torch 700 of FIG. 7 needs to be sufficiently long such that it can electrically and physically contact the torch body 704 to establish a current path. In some embodiments, the electrode 706 of FIG. 7 is about 3 times longer than the electrode 108 of FIG. 1. The coolant tube 702 of the torch 700 merely carries a coolant flow from the torch body 704 to the electrode 706. Further, the electrode 108 of the present invention is rotatably independent relative to the coolant tube 116, whereas the electrode 706 of the conventional torch 700 is fixedly engaged to the torch body 704 and cannot rotate independently relative to the coolant tube 702.

Figure 8:
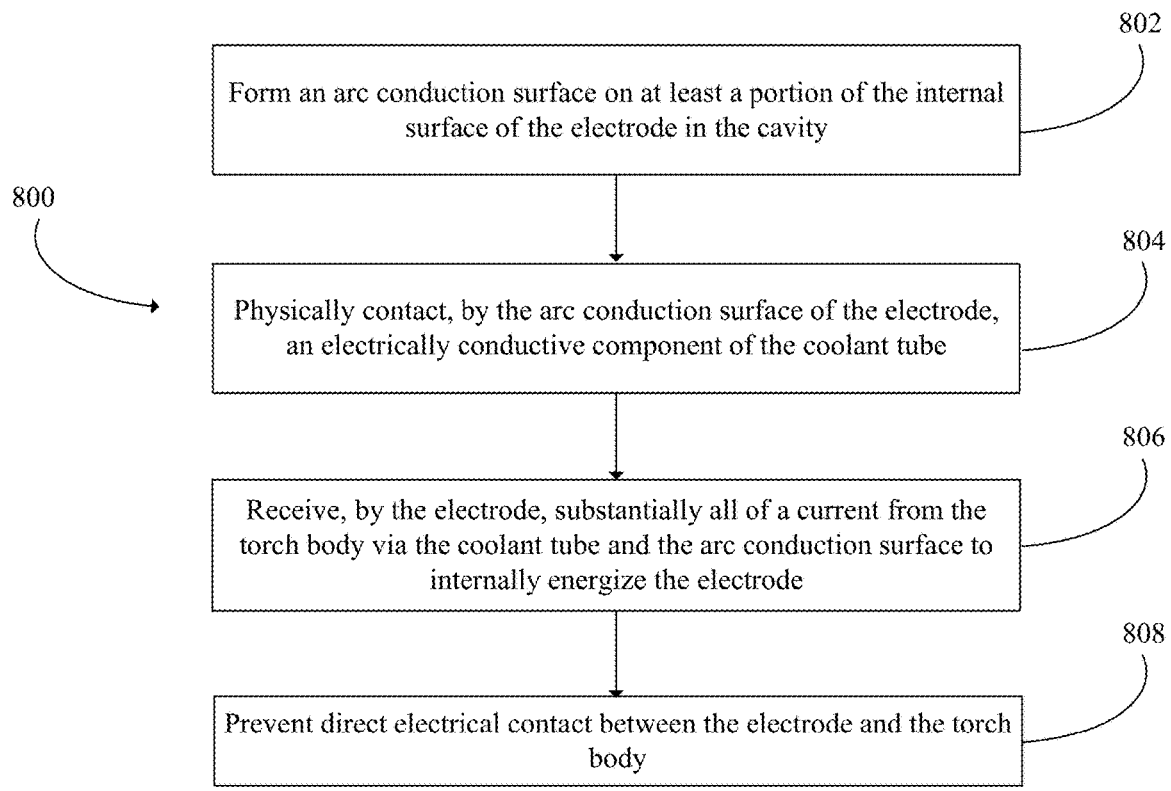
FIG. 8 is an exemplary process for electrically energizing the electrode in the plasma arc torch of FIG. 1, according to an illustrative embodiment of the present invention.

FIG. 8 provides an exemplary process for electrically energizing the electrode 108 in the plasma arc torch 10 of FIG. 1, according to an illustrative embodiment of the present invention. The process 800 includes forming the arc conduction surface 364 on at least a portion of the internal surface of the electrode 108 in its internal cavity 354 (step 802). Thus, upon engagement of the torch body 102 and the cartridge 104, where the distal end 242 of the coolant tube 116 is inserted into the electrode 108, the Louvertac band 204 of the coolant tube 116 is adapted to electrically and physically contact the arc conduction surface 364 (step 804). This contact allows the electrode 108 to receive substantially all of a current (i.e., pilot and/or transferred arc current) from the torch body 102, such as from the cathode block 180 of the torch body 102, via the coolant tube 116 to internally energize the electrode 108 within its cavity 354 (step 808). Further, since substantially all of a current can be indirectly passed from the torch body 102 to the electrode 108 via the coolant tube 116, direct electrical contact between the electrode 108 and the torch body 102 becomes unnecessary and can be prevented by, for example, inserting an insulator (e.g., a non-conductive swirl ring 152) between the electrode 108 and the torch body 102 (step 808). In addition to supporting conduction of substantially all of an electrical current, the Louvertac band 204 can also radially center the electrode 108 relative to the coolant tube 116 once the coolant tube 116 is fully seated within the cavity 354.

In some embodiments, the process 800 further includes matingly engaging the proximal end 240 of the coolant tube 116 with the torch body 102. This engagement can be achieved by inserting the proximal end 240 of the coolant tube 116 into the interior channel 132 of the cathode block 180 of the torch body 102 until the Louvertac band 202 surrounding the proximal end 240 is fully seated within the interior channel 132 by an interference fit. Alternatively, this engagement can be achieved by threading the proximal end 240 of the coolant tube 116 to the interior channel 132 without using a Louvertac band. Similarly, the process 800 can include matingly engaging the distal end 242 of the coolant tube 116 with the electrode 108. This engagement can be achieved by inserting the distal end 242 of the coolant tube 116 into the cavity 354 of the electrode 108 until the Louvertac band 204 surrounding the distal end 242 is fully seated within the cavity 354 by an interference fit. In such a case, the distal end 242 of the coolant tube 116 can be affixed to the cavity 354 using an axial pushing motion without using any rotational force.

In some embodiments, the process 800 further includes conducting a liquid coolant flow from the torch body 102 to the cavity 354 of the electrode 108 via an interior region of the coolant tube 116. Thereafter, the coolant flow impinges against a distal bottom of the cavity 354 as it exits the coolant tube 116 and enters the cavity 354. The coolant flow then reverses toward the torch body 102 over an exterior surface of the coolant tube 116 as guided by the interior sidewall of the cavity 354. This reverse flow allows the coolant flow to pass through the longitudinal channels 244 disposed on the exterior surface of the coolant tube 116, thereby reducing a pressure of the coolant flow across the coolant tube 116.

Figure 9A:
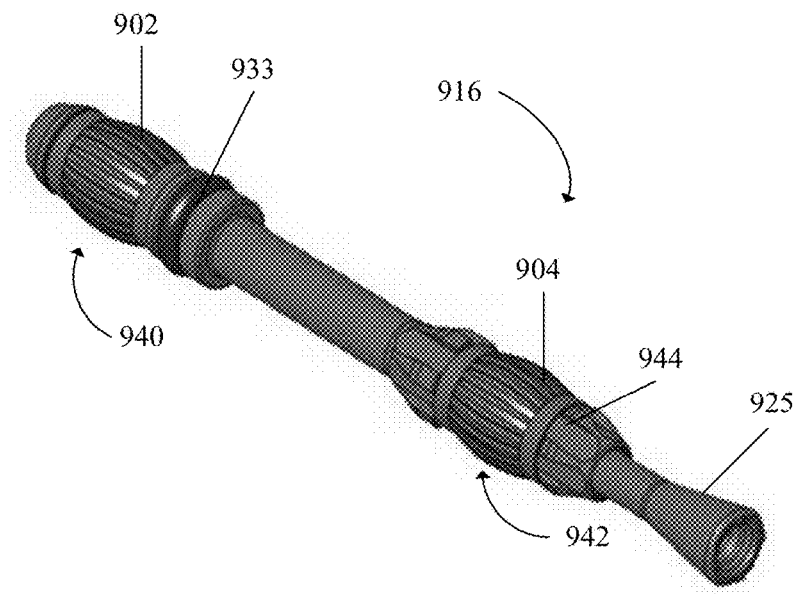
FIGS. 9a and 9b are perspective and cross-sectional views, respectively, of another exemplary coolant tube of the present invention.
Figure 9B:
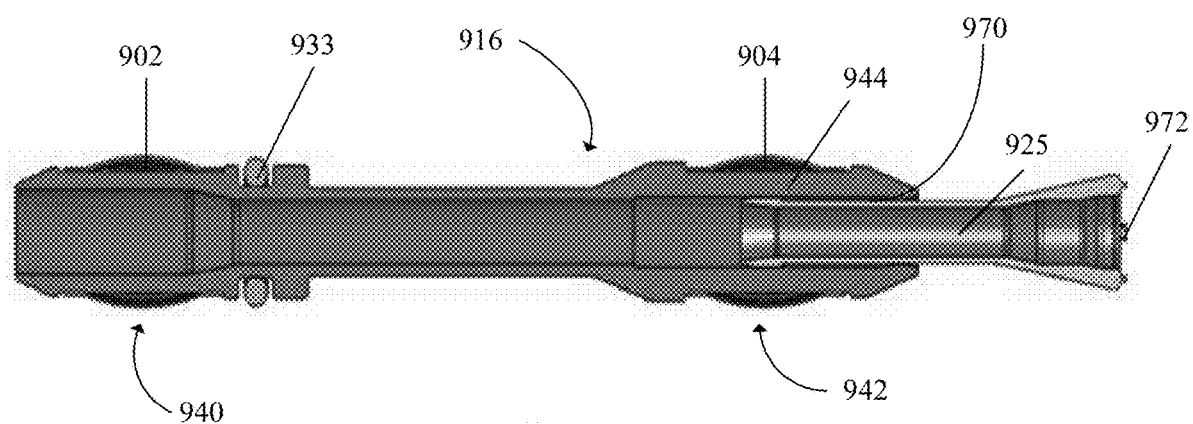

FIGS. 9*a* and 9*b* are perspective and cross-sectional views, respectively, of another exemplary coolant tube 916 of the present invention. This coolant tube 916 is compatible with the torch body 102 and the cartridge 104 illustrated and described above and can easily replace the coolant tube 116 while providing substantially the same functions as the coolant tube 116.

As shown, the coolant tube 916 has an elongated body with a proximal portion (generally referred to as the proximal end) 940, which is the end that is configured to engage with the cathode block 180 of the torch body 102, and a distal portion (generally referred as the distal end) 942, which is the end that is configured to engage with the electrode 108 of the cartridge 104 as the torch body 102 is secured to the cartridge 104. The coolant tube 916 can have a distal tip 925 disposed at the distal portion 942. In some embodiments, the distal tip 925 has a bell/flared shape. The proximal end 940 of the elongated body of the coolant tube 916 can include an o-ring 933 circumferentially disposed about an external surface of the coolant tube 916 to couple the coolant tube 916 to the torch body 102. The coolant tube 916 can have an electrical connector, such as a Louvertac™ band 902, around an external surface at the proximal end 940 and an electrical connector, such as a Louvertac™ band 904, around an external surface at the distal end 942. The coolant tube 916 can further include one or more longitudinal liquid flow channels 944 circumferentially disposed about its exterior surface below the Louvertac band 904 at the distal end 942. The design and function of the Louvertac bands 902, 904 and the longitudinal channels 944 can be substantially the same as the Louvertac bands 202, 204 and the longitudinal channels 244, respectively, of the coolant tube 116.

In some embodiments, the distal tip 925 of the coolant tube 916 is axially and/or rotatably independent of the remaining portion of the coolant tube 916. During assembly, a proximal end of the distal tip 925 can slide into an internal cavity 970 of the coolant tube 916 that is defined partly by the longitudinal channels 944. The distal tip 925 can rotate freely within the cavity 970. The distal tip 925 can also move axially within the internal cavity 970, but is prevented from being pulled out of the cavity 970 (i.e., is retained axially within the cavity 970) via an interference fit formed between a set of steps in the cavity 970 and a complementary set of steps on an exterior surface of the distal tip 925. For example, a distal edge of the cavity 970 can form a lip that is configured to mate with a complementary circumferential lip on the distal tip 925 to retain the distal tip 925 within the cavity 970. Thus, the distal tip 925 can move relative to both the electrode 108 and coolant tube 116. The axial and/or radial freedom achieved by such an engagement can help with installation of the electrode/cartridge and limit pressure drops in the coolant flow. In some embodiments, the bell-shaped distal end of the distal tip 925 is configured to accommodate electrodes of different lengths and allows the coolant tube 916 to float within the electrode 108. For example, the coolant tube 916 can include one or more small stands 972 at the distal end of the distal tip 925, where the stands 972 can (i) rest against and in physical contact with the electrode 108 during a torch operation or (ii) be remote from and maintain a physical gap with (i.e., float within) the electrode 108 such that no direct contact occurs. In some embodiments, the coolant tube 916 is radially centered relative to the cavity 354 of the electrode 108 for even cooling. In some embodiments, the distal tip 925 of the coolant tube 116 is adapted to bias backward in the proximal direction within the cavity 970 by a flow of coolant through coolant tube 916 while the remaining portion of the coolant tube 916 remains relatively stationery. Hence, the distal tip 925 can slide axially within the internal cavity 970 of the coolant tube 916.

As explained above, the present invention features a simplified electrode that is shorter than a conventional electrode (e.g., 27% shorter) with fewer features (e.g., no threading and tool-free). The present invention also features torch designs that facilitate installation of torch components onto a torch body, such as enabling relatively straight axial installation and removal of a cartridge onto a torch body (e.g., in a push/pull fashion). This ease of installation is also enhanced by reducing the precision required for positioning and engaging the cartridge to the torch body, which can reduce tolerancing on the torch. In addition, the placement of the Louvertac bands on the coolant tube allows these bands to be easily accessed and inspected, thus allowing them to be readily serviceable. Further, the present invention reduces fluid pressure drop across a coolant tube by allowing additional fluid flow through one or more channels on an exterior surface of the coolant tube.

It should be understood that various aspects and embodiments of the invention can be combined in various ways. Based on the teachings of this specification, a person of ordinary skill in the art can readily determine how to combine these various embodiments. Modifications may also occur to those skilled in the art upon reading the specification.

What is claimed is:

1. A coolant tube for a plasma arc torch, the coolant tube comprising:
   an elongated coolant tube body, made from an electrically conductive material, including a first end configured to engage an electrode and a second end configured to engage a body of the plasma arc torch;
   a first electrically conductive element coupled to the first end of the elongated coolant tube body, the first electrically conductive element being resilient and configured to physically contact the electrode; and
   a second electrically conductive element coupled to the second end of the elongated coolant tube body, the second electrically conductive element being resilient and configured to physically contact the body of the plasma arc torch;
   wherein the elongated coolant tube body defines a current path and a fluid path between the body of the plasma arc torch and the electrode,
   and wherein substantially all of a current from the body of the plasma arc torch is passed to the electrode via the conductive coolant tube through (i) a first physical interface formed between the body of the plasma arc torch and the second electrically conductive element that is coupled to the coolant tube and (ii) a second physical interface between the electrode and the first electrically conductive element that is coupled to the coolant tube, without passing the current directly from the body of the plasma arc torch to the electrode.

2. The coolant tube of claim 1, further comprising a plurality of liquid flow channels circumferentially disposed about an external surface of the coolant tube at the first end of the elongated coolant tube body.

3. The coolant tube of claim 2, wherein the first electrically conductive element substantially overlays the plurality of liquid flow channels on the exterior surface of the coolant tube.

4. The coolant tube of claim 1, wherein at least one of the first or second electrically conductive element is a Louvertac™ band.

5. The coolant tube of claim 1, wherein the second electrically conductive element is a threaded section configured to engage the body of the plasma arc torch.

6. The coolant tube of claim 1, wherein the first electrically conductive element is adapted to physically contact the electrode at an internal surface of the electrode.

7. The coolant tube of claim 1, wherein the second electrically conductive element is adapted to physically contact the body of the plasma arc torch at an internal surface of the body.

8. The coolant tube of claim 1, wherein the current path defined by the elongated coolant tube body is configured to carry a current of at least about 30 amps (A).

9. The coolant tube of claim 1, wherein the second end of the elongated coolant tube body comprises a sealing surface circumferentially disposed about an external surface of the coolant tube.

10. The coolant tube of claim 1, further comprising one or more positioning features on an external surface of the first end of the coolant tube, the one or more positioning features configured to radially center the coolant tube relative to the electrode.

11. A method of electrically energizing an electrode in a plasma arc torch comprising a torch body matingly engaged to a second end of a coolant tube made from an electrically conductive material, a first end of the coolant tube being matingly engaged to a cavity defined by an internal surface of the electrode, the method comprising:
   forming an arc conduction surface on at least a portion of the internal surface of the electrode in the cavity;
   physically contacting, by the arc conduction surface of the electrode, an electrically conductive resilient component physically coupled to the coolant tube;
   receiving, by the electrode, substantially all of a current from the torch body via an indirect path defined by at least the coolant tube, the electrically conductive resilient component, and the arc conduction surface to internally energize the electrode; and
   preventing direct electrical contact between the electrode and the torch body such that substantially all of the current is prevented from being directly passed from the torch body to the electrode.

12. The method of claim 11, wherein the electrically conductive resilient component comprises a tolerance band adapted to conduct substantially all of the current.

13. The method of claim 11, wherein the arc conduction surface comprises at least a portion of a sidewall of the cavity.

14. The method of claim 11, wherein the electrode is without a thread.

15. The method of claim 11, further comprising radially centering the electrode relative to the coolant tube.

16. The method of claim 11, wherein the electrode has a length-to-width radio of about 4.

17. A method of electrically energizing an electrode, the method comprising:
   matingly engaging a second end of a coolant tube with a plasma arc torch body, the coolant tube being made from an electrically conductive material;

matingly engaging a first end of the coolant tube with a cavity defined by an internal surface of the electrode;

forming a physical interface between at least a portion of the internal surface of the electrode in the cavity and an electrically conductive component of the coolant tube;

passing substantially all of a current from the plasma arc torch body to the electrode via the coolant tube and the physical interface to internally energize the electrode;

preventing direct electrical contact between the torch body and the electrode such that substantially all of the current is passed through the coolant tube; and conducting a liquid coolant flow from the torch body to the cavity of the electrode via an interior region of the coolant tube.

18. The method of claim 17, wherein matingly engaging a second end of a coolant tube with a plasma arc torch body comprises fitting by interference a Louvertac™ band at the second end of the coolant tube into a cavity defined by the torch body.

19. The method of claim 17, wherein matingly engaging a second end of the coolant tube with a plasma arc torch body comprises threading the second end of the coolant tube to the torch body.

20. The method of claim 17, wherein matingly engaging a first end of the coolant tube with a cavity of the electrode comprises fitting by interference the electrically conductive component into the cavity of the electrode.

21. The method of claim 17, wherein matingly engaging a first end of the coolant tube with a cavity of the electrode comprises axially affixing the cavity of the electrode to the first end of the coolant tube substantially without rotational engagement.

22. The method of claim 17, wherein the electrically conductive component comprises a Louvertac™ band.

23. The method of claim 17, further comprising:
impinging the coolant flow against a distal bottom of the cavity;
reversing the coolant flow toward the torch body over an exterior surface of the coolant tube; and
passing the coolant flow through a plurality of longitudinal channels disposed on the exterior surface of the coolant tube at the first end, thereby reducing a pressure of the coolant flow.

24. The method of claim 17, further comprising radially centering the coolant tube in relation to the electrode.

25. An electrode assembly for a liquid-cooled plasma arc torch, the electrode assembly comprising:
an elongated electrode body defining a cavity configured to receive a distal portion of an electrically conductive coolant tube;
an arc conduction surface formed on an interior surface of the elongated electrode body and defining at least a portion of the cavity, the arc conduction surface configured to electrically contact the coolant tube in the cavity;
an insulator disposed on an external surface of the elongated electrode body configured to prevent direct electrical contact between a torch body and the elongated electrode body such that substantially all of a current passes from the torch body to the elongated electrode body via the electrically conductive coolant tube and the arc conduction surface; and
an emissive insert disposed at a distal end of the elongate body.

* * * * *